United States Patent
Passe et al.

(10) Patent No.: US 10,049,543 B1
(45) Date of Patent: *Aug. 14, 2018

(54) COVERT INFRARED MONITORING AND RECORDING OF IMAGES AND VIDEO IN CONTROLLED-ENVIRONMENT FACILITIES

(71) Applicant: Securus Technologies, Inc., Dallas, TX (US)

(72) Inventors: Scott Passe, Forney, TX (US); Luke Keiser, Frisco, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,752

(22) Filed: Oct. 18, 2016

Related U.S. Application Data

(63) Continuation of application No. 14/788,220, filed on Jun. 30, 2015, now Pat. No. 9,472,071.

(51) Int. Cl.
| | |
|---|---|
| *H04N 7/15* | (2006.01) |
| *G08B 13/196* | (2006.01) |
| *H04N 7/14* | (2006.01) |
| *H04N 5/33* | (2006.01) |
| *G08B 13/19* | (2006.01) |

(52) U.S. Cl.
CPC ....... *G08B 13/19636* (2013.01); *G08B 13/19* (2013.01); *G08B 13/19613* (2013.01); *H04N 5/33* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 8,582,738 B1 | 11/2013 | Keiser | |
| 2008/0277486 A1* | 11/2008 | Seem | F24F 11/0009 236/49.3 |
| 2009/0160640 A1* | 6/2009 | Leung | G06F 1/1626 340/539.11 |
| 2012/0059760 A1 | 3/2012 | Rosenfield et al. | |
| 2012/0262271 A1 | 10/2012 | Torgersrud et al. | |
| 2013/0007215 A1* | 1/2013 | Xue | H04N 7/147 709/217 |
| 2013/0058469 A1 | 3/2013 | Gongware et al. | |

(Continued)

*Primary Examiner* — Creighton Smith
(74) *Attorney, Agent, or Firm* — Fogarty LLP

(57) ABSTRACT

An infrared image and/or a video of one or more residents of a controlled-environment facility is captured using an imaging device of a controlled-environment facility resident communication and/or media device disposed within the controlled-environment facility when the device is not being used in a communication session. The imaging device of the controlled-environment facility resident communication and/or media device is capable of operation with an infrared light source. The infrared image or video may be stored and/or presented to an entity associated with the controlled-environment facility, such as personnel of the facility, a facility administration system, etc. Capturing the image may include turning on at least one infrared light source on the device and/or turning off any indication that the capturing is taking place. The device may be located in a resident sleeping area and a bed check may be performed by the entity or device, using the infrared image.

22 Claims, 6 Drawing Sheets

(56) References Cited

U.S. PATENT DOCUMENTS

| | | | |
|---|---|---|---|
| 2013/0178243 A1* | 7/2013 | Tsai | H04M 1/7253 |
| | | | 455/556.1 |
| 2015/0077556 A1* | 3/2015 | Reed | H04N 7/183 |
| | | | 348/148 |
| 2015/0168249 A1* | 6/2015 | Mian | G08B 13/1672 |
| | | | 348/143 |
| 2015/0358589 A1 | 12/2015 | Passe | |
| 2016/0150966 A1* | 6/2016 | Heinrich | A61B 5/0064 |
| | | | 600/476 |
| 2016/0170017 A1* | 6/2016 | Ho | G08B 13/1645 |
| | | | 342/53 |
| 2016/0259904 A1* | 9/2016 | Wilson | G06F 19/3462 |
| 2017/0104869 A1* | 4/2017 | Hodge | H04M 3/38 |

\* cited by examiner

COVERT INFRARED MONITORING AND RECORDING OF IMAGES AND VIDEO IN CONTROLLED-ENVIRONMENT FACILITIES

CROSS REFERENCE TO RELATED APPLICATIONS

This is a continuation of, and claims benefit of, U.S. patent application Ser. No. 14/788,220 filed on Jun. 30, 2015 and also entitled "Covert Infrared Monitoring and Recording of Images and Video in Controlled-Environment Facilities," which issued as U.S. Pat. No. 9,472,071 on Oct. 18, 2016, and which is herein incorporated by reference.

TECHNICAL FIELD

This specification relates generally to controlled-environment facilities, and, more particularly, to systems and methods for covertly monitoring and/or recording images and/or video in controlled-environment facilities using infrared imaging by intelligent controlled-environment facility resident communications and/or media devices.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and online chat sessions.

To enable these various types of communications, a jail or prison may install communication devices in different parts of the facility. Such communication devices are generally used to enable inmate communications. For example, at the time of a scheduled visitation, an officer may physically move the inmate from his or her cell or to a communication device or station in a designated area within the correctional facility, where he or she may be able to conduct a remote visitation with friends, family, acquaintances, etc. When the communication is over, the officer may then escort the inmate back to his or her cell.

SUMMARY

The present invention is directed to systems and methods which capture an image and/or a video of one or more residents of a controlled-environment facility using an imaging device capable of operation with an infrared light source. The imaging device being part of a controlled-environment facility resident communication and/or media device disposed within the controlled-environment facility when the controlled-environment facility resident communication and/or media device is not being used in any communication session during at least a portion of the capturing. The controlled-environment facility resident communication and/or media device may be a video visitation device, personal resident communications and/or media device, or the like. At least one infrared light source on the controlled-environment facility resident communication and/or media device may be turned on for capturing the image and/or video using the imaging device. The controlled-environment facility resident communication and/or media device might include a recording indicator, and in such case the recording indicator may be turned off so it does not provide any indication that the capturing is taking place. Additionally or alternatively, the controlled-environment facility resident communication and/or media device may include an electronic display and the electronic display preferably does not provide any visual indication that the capturing is taking place. The controlled-environment facility may be a correctional facility and these resident(s) may be inmates. In such embodiments, the controlled-environment facility resident communication and/or media device may be located in a pod or cell within the correctional facility.

The captured infrared image or a video may be stored and/or presented for review by an entity associated with the controlled-environment facility. In various embodiments, such as where the controlled-environment facility resident communication and/or media device is located in a resident sleeping area or unit of the controlled environment facility, a bed check may be performed, such as by the controlled-environment facility resident communication and/or media device itself, and/or by an entity associated with the controlled-environment facility using the presented or stored image. For example, a bed check may be performed by the controlled-environment facility resident communication and/or media device, confirming presence of a number of expected heat signatures indicative of an expected number of residents in beds in the sleeping area or unit and an alert may be issued to the entity associated with the controlled-environment facility if the expected number of residents are not present. The entity associated with the controlled-environment facility may be personnel of the facility, a facility administration system, etc.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
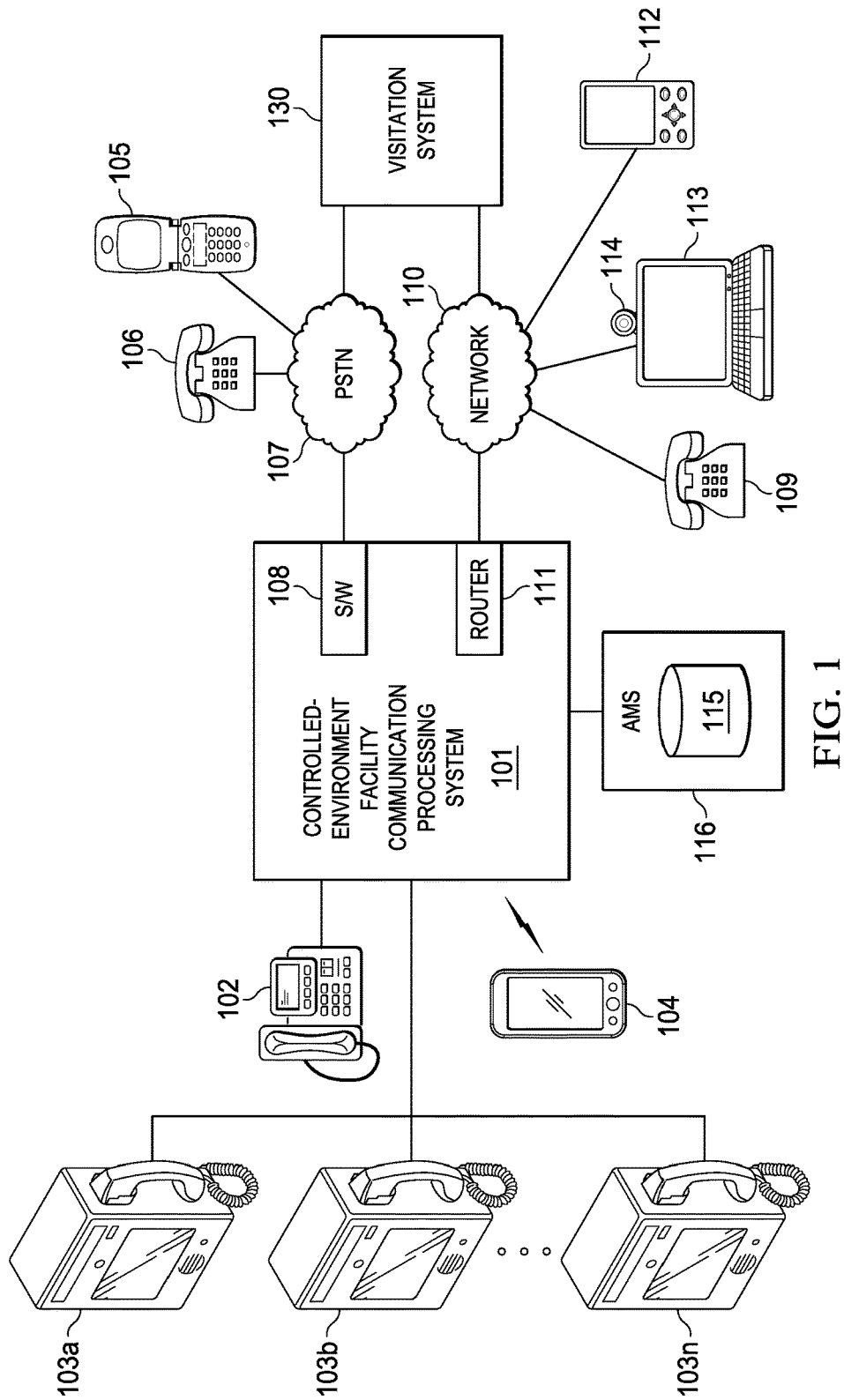
Figure 2:
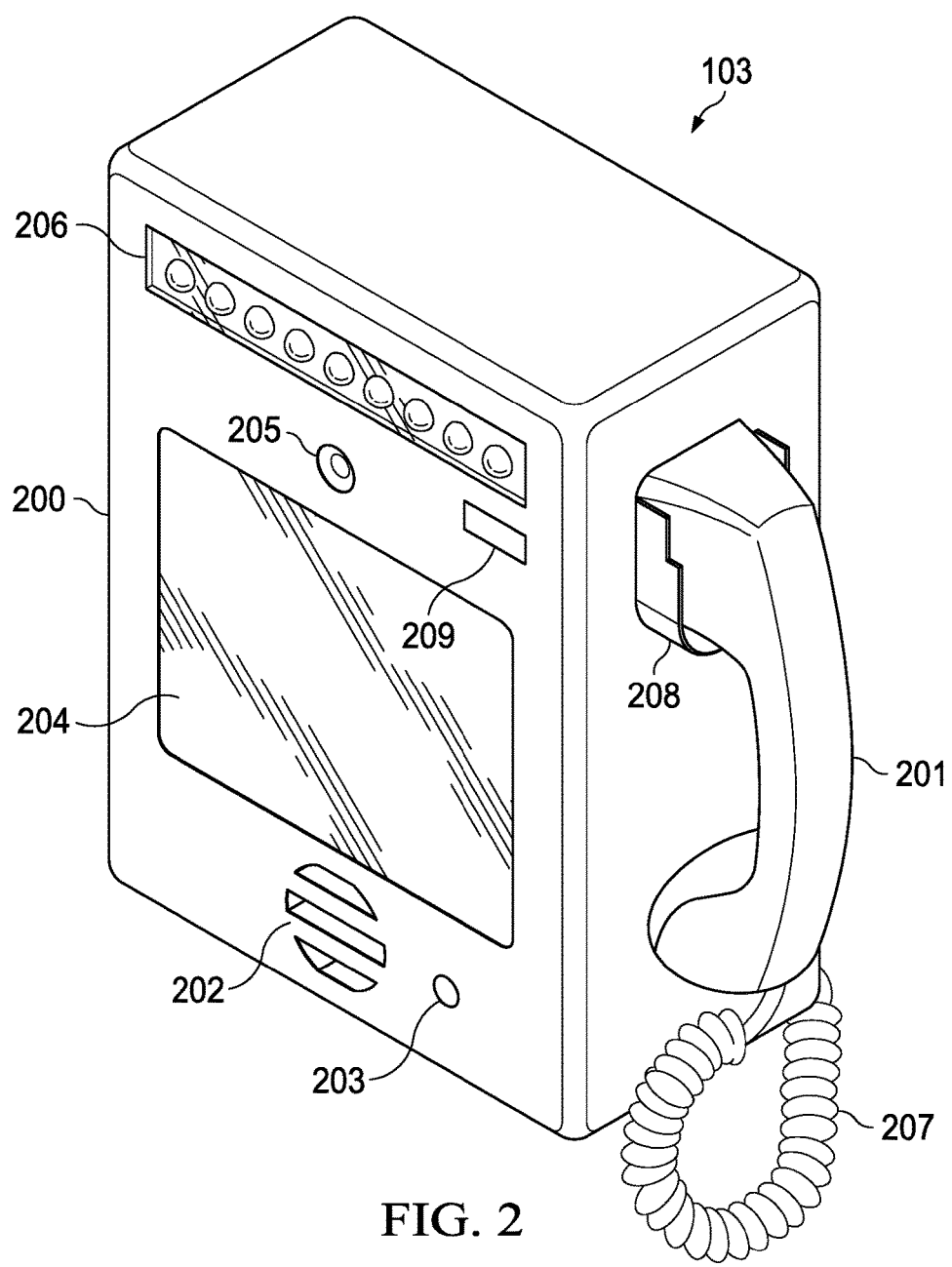
Figure 3:
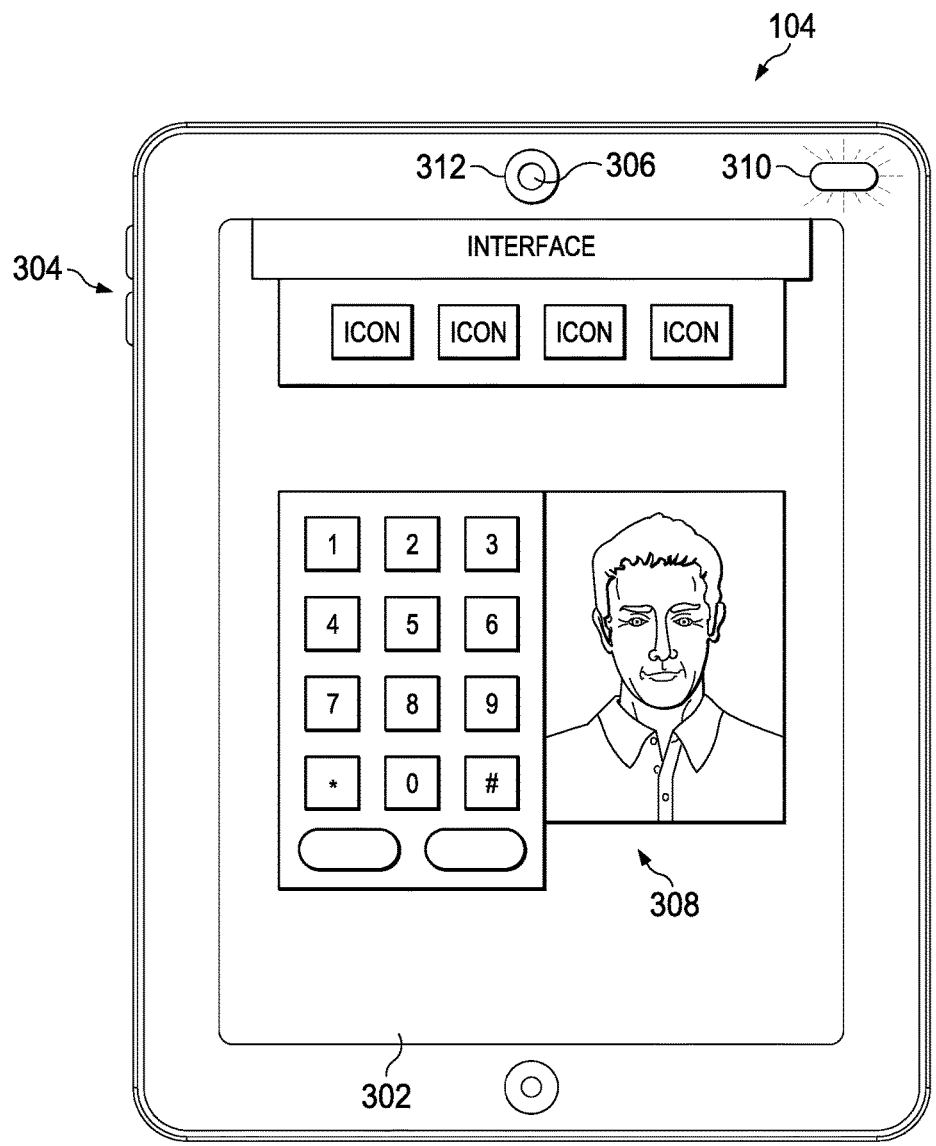
Figure 4:
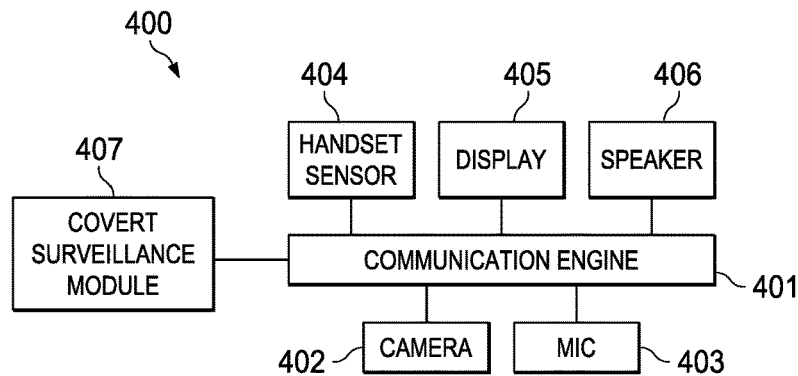
Figure 5:
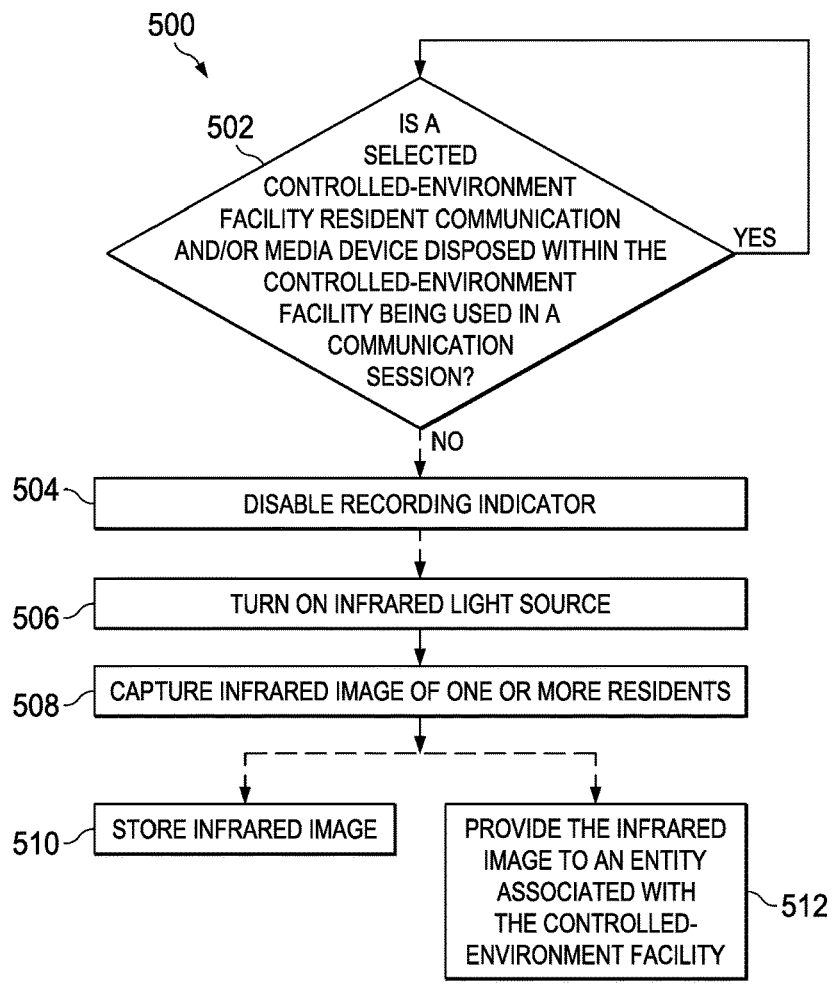
Figure 6:
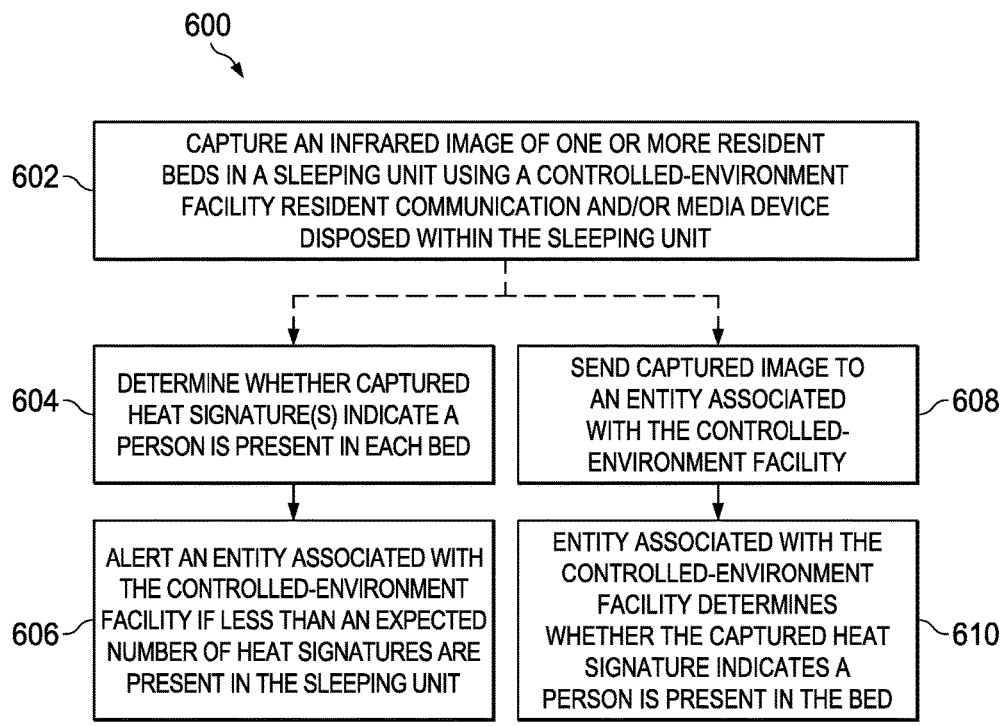
Figure 7:
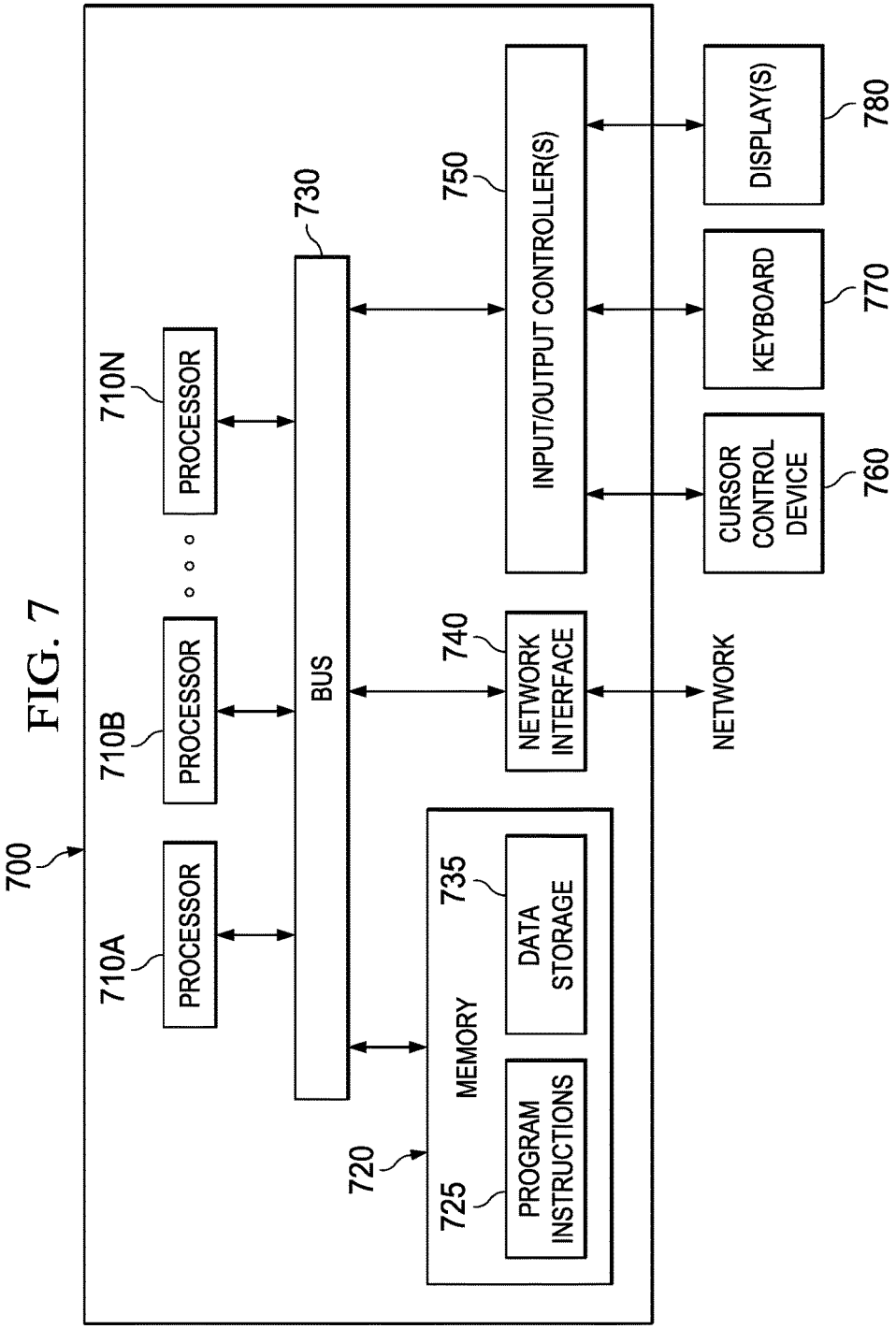

Having thus described the invention in general terms, reference will now be made to the accompanying drawings, which are not necessarily drawn to scale:

FIG. 1 is a block diagram of an example of an environment where intelligent controlled-environment facility resident communications and/or media devices may be deployed, according to some embodiments;

FIG. 2 is a diagrammatic illustration of an example of a intelligent facility communication and/or media device, according to some embodiments;

FIG. 3 is a diagrammatic illustration of an example intelligent resident communication and/or media device, according to some embodiments of the present systems and methods;

FIG. 4 is a block diagram of an example of communication device software, according to some embodiments;

FIG. 5 is a flowchart of an example implementation for covert infrared monitoring and recording of images and video in controlled-environment facilities, according to some embodiments;

FIG. 6 is a flowchart of an example implementation for performing (covert) bed checks using infrared monitoring and/or recording of images and video in controlled-environment facilities, according to some embodiments; and FIG. 7 is a block diagram of an example of a computer system configured to implement various systems and methods described herein according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The inventors hereof have recognized that correctional facilities present numerous difficulties in areas such as security, surveillance, financial transactions, communications, visitation, investigation, budgetary, etc.; which in turn make technological implementations uniquely challenging in those environments. In many cases, technologies that are used outside of correctional facilities are not immediately applicable to the correctional environment without significant changes and modifications. Moreover, correctional facilities may have specific needs that are not particularly relevant outside of those environments. As such, some of the systems and methods described herein may be specifically tailored to address one or more of the aforementioned needs and challenges.

This specification relates generally to such controlled-environment facilities, disclosing systems and methods for covertly monitoring and/or recording of images and/or video in controlled-environment facilities. More particularly, systems and methods disclosed herein covertly monitor and/or record images and/or video in controlled-environment facilities using infrared imaging by intelligent controlled-environment facility resident communications and/or media devices. Such an intelligent controlled-environment facility resident communication and media device may be an Intelligent Facility Device (IFD) (e.g. a video phone particularly adapted for use in a controlled-environment facility) or an Intelligent Resident Device (IRD) (e.g. a personal wireless devices, such as a tablet computing device or smartphone, which may be adapted and/or approved for use in controlled-environment facility), described in greater detail below. Regardless, IFDs, IRDs, or the like, may be generally referred to herein as controlled-environment facility resident communication and/or media devices, or the like, in that they are devices that residents of a controlled-environment facility may use for communication, such as with non-residents, and/or for accessing media.

In accordance with such embodiments of the present systems and methods, an image and/or a video of one or more residents of a controlled-environment facility is captured using an imaging device capable of operation with an infrared light source. The imagining device being part of a controlled-environment facility resident communication and/or media device disposed within the controlled-environment facility, when the device is not being used in a communication session. The infrared image or video may be stored and/or presented to an entity associated with the controlled-environment facility, such as personnel of the facility, a facility administration system, etc. Capturing the image may include turning on at least one infrared light source on the device and/or turning off any indication that the capturing is taking place. The device may also be located in a resident sleeping area and a bed check may be performed by the entity or device, using the infrared image.

The present systems and methods provide covert infrared visual monitoring utilizing IFDs and/or IRDs. IFDs may utilize visible subject lighting during communications or when the subject is otherwise aware the device is capturing the resident's image, so the monitored subject(s) are generally aware that visual monitoring is taking place. In a "sleeping area or unit" environment, visible subject lighting may be intrusive or disruptive. In accordance with embodiments of the present systems and methods, an infrared light source, or the like, such as infrared LEDs may be employed in conjunction with infrared sensitive IFD and/or IRD cameras, such as by adding the infrared light source to the subject lighting of an IFD and/or IRD. In combination with a solid-state camera typically found in such IFDs and/or IRDs, which may auto adjust to employ infrared light, addition of (an) infrared light source(s), enables covert surveillance of controlled-environment facility residents, in a dark (e.g. nighttime) environment. This enables covert monitoring of an area where an IFD and/or IRD is installed or present. Thus, in accordance with various embodiments of the present systems and methods, when an IFD is installed, or an IRD is situated, in a resident sleeping area (e.g. in an inmate cell in correction environments) covert or non-intrusive automated "bed checks" may be facilitated. The microphone on a receiver handset of an IFD and/or the microphone of an IRD could also be utilized to add covert audio monitoring.

Turning now to FIG. 1, a block diagram of an illustrative environment where a visitation system may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a video visitation device 103 or a personal computer wireless device, such as a tablet computing device or smartphone 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102, 103 and/or 104. Intelligent controlled-environment facility resident communication and media devices employed in accordance with the present systems and methods may include a video visitation device 103, referred to herein as an Intelligent Facility Device (IFD) (e.g. a video phone particularly adapted for use in a controlled-environment facility) or personal computer wireless device 104, referred to herein as an Intelligent Resident Device (IRD) (e.g. a personal wireless device, such as a tablet computing device or smartphone, which may be adapted and/or approved for use in controlled-environment facility), described in greater detail below. Such a device may be referred to as an Intelligent Inmate Device (IID) in a correctional institution environment, and/or an Intelligent Resident Device (IRD), or the like, in controlled-environment facilities, in general. Regardless, as noted, IFDs, IIDs, IRDs, etc. may be generally referred to herein as controlled-environment facility resident communication and/or media devices, or the like, in that they are devices that residents of a controlled-environment facility may use for communication, such as with non-residents, and/or for accessing media.

Under control of communication processing system 101, devices 102 through 104 may be capable of connecting to a non-resident's (i.e., a person not committed to a controlled-environment facility) telephone 106 or device 105 across a publicly switched telephone network (PSTN) 107. For example, telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109.

Video visitation devices 103*a-n* (each collectively referred to as "IFD 103") are communication devices with video conferencing and/or multimedia capabilities to enable inmates to participate in voice calls, video visitation sessions with non-residents of the correctional facility, secure online chat, Internet access, etc. For example, a non-resident party may have a personal or laptop computer 113 with camera 114 (or a cell phone, tablet computer, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards.

In addition to providing certain visitation and communication operations, communication processing system 101 may, in, such as for example, a correctional facility embodiment, attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by an Administration and Management System (AMS) 116. In addition to PAC list(s), AMS 116 may also store inmate or resident profile data (RPD), as well as visitation rules applicable to each inmate. As an example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, database 115 may include biometric signatures of inmates (e.g., voice, facial, iris, fingerprint, etc.) and/or of other facility personnel (e.g., correctional officers, staff, etc.). In addition, database 115 may include one or more covert surveillance rules including, for example, the times and dates of scheduled covert monitoring and/or recording, identity of inmates that are the target of ongoing investigations, a maximum threshold number of inmates allowed to be in different areas within the facility at a given time, etc.

In scenarios where communication system 101 is located within the facility, it may have direct access to AMS 116. In other embodiments, however, communication system 101 may be located remotely with respect to the controlled-environment facility (or it may have certain elements disposed within the facility and other elements disposed remotely with respect to the facility) and access to AMS 116 may be obtained via a computer network such as, for example network 110.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more switches and/or routers (not shown). Accordingly, visitation system 130 may be configured to communicate with one or more residents of the controlled-environment facility via devices 102 through 104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

FIG. 2 is a diagram of IFD 103. In some embodiments, device 103 may be implemented as a computer-based system such as described in connection with FIG. 7. Also, in some implementations, IFD 103 may be located in a pod, which is a separate and self-contained housing unit within a correctional facility designed to hold a number of inmates (e.g., ~12 to 50 prisoners). A small number of prison officers (e.g., ~2 or 3), and sometimes a single officer or other facility personnel, supervise each pod. Each pod may contain tiers of cells arranged around a central control station or desk from which a single officer can monitor all the cells and the entire pod, control cell doors, and communicate with the rest of the inmates. Additionally or alternatively, IFD 103 may be disposed in a visitation area of the correctional facility. In other embodiments, IFD 103 may be disposed outside of the correctional facility or within a sleeping area, such as in a cell.

As illustrated, device 103 includes display 204, camera 205, and handset 201 coupled to device 103 via wire 207. Display 204 may be any suitable electronic display such as, for example, a Liquid Crystal Display (LCD), a touchscreen display (e.g., resistive, capacitive, etc.), or the like, whereas camera 205 may be a suitable imaging device such as, for instance, a video camera or webcam equipped with Charge-Coupled Devices (CCDs), Complementary Metal-Oxide-Semiconductor (CMOS) active pixel sensors, etc. Camera 205 may be infrared sensitive. Some IFDs may employ visible light sources for enabling capture of conventional images and/or video. Embodiments of such IFDs and/or IRDs may employ this same light module 206, such as under software control, to selectively control the light module to emit visible and/or infrared light, in accordance with embodiments of the present systems and methods. Handset 201 may be similar to a traditional telephone handset including an earpiece portion (with a loudspeaker), a handle portion, and a mouthpiece portion (with a microphone).

During a video visitation session, IFD 103 may be configured to capture a video image of an inmate to be transmitted to a non-resident using camera 205, and to display a video image of the non-resident to the inmate using display 204. An indicator, such as indictor light 209 may light to indicate that the resident's image is being captured. Additionally or alternatively screen 204 may display an indication that the user's image is being recorded or otherwise captured. IFD 103 may also be configured to capture an audio signal from the inmate to be transmitted to the non-resident using the mouthpiece portion of handset 201, and to provide an audio signal from the non-resident to the inmate using the earpiece portion of handset 201. Additionally or alternatively, audio received from the non-resident may be reproduced via loudspeaker 202, and audio provided by the inmate may be captured via microphone 203. In some embodiments, handset holder or holster 208 may be configured to allow a user to securely rest handset 201 against device 103 (e.g., in the "on hook" position) when device 103 is not in use. Furthermore, handset holder 208 may include a mechanical or electromechanical switch or sensor (not shown) that senses when handset 201 is not resting against it (e.g. in the "off hook" position).

It should be noted that, outside of correctional facilities, IFD 103 may assume the form of any computer, tablet computer, smart phone, etc., or any other consumer device or appliance with videoconferencing capabilities. Meanwhile, in the context of correctional facilities, IFD 103 may include one or more tampering/impact resistant or hardened elements configured to protect them from vandalism or otherwise destructive acts. For example, one or more of elements 202 through 206 may be protected by a transparent plastic or thermoplastic (e.g., Plexiglas, etc.) material.

IRDs 104 may be tablet computing devices, smartphones, media players, or the like adapted and/or approved for use by residents of the controlled-environment facility (within the controlled-environment facility). Each IRD 104 may be particularly adapted for use in a controlled-environment. For example, such an IRD (or IID) may have a specially adapted operating system and/or may be "stripped-down," particularly from the standpoint of what apps and/or hardware are provided or allowed on IRD 104, and/or connectivity afforded such an IRD. For example, such an IRD may employ an operating system kernel such one based upon an open source platform such as the CyanogenMod-based operating system, which may be built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the structure of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, In accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon to be released inmates transition. For example, the IRD may be used to communicate with a future employer, or the like. As such, IRDs may be sponsored, or otherwise subsidized by organizations or companies, assisting with the transition of inmates into society.

FIG. 3 is a diagrammatic illustration of example intelligent resident communication and/or media device 104, according to some embodiments of the present systems and methods. IRD 104 includes screen 302 one or more hardware buttons 304 and a camera 306. A resident making a phone call on device 104 and talking to the called party, using open phone app 308 would appreciate that their image is being captured. However, in accordance with embodiments of the present systems and methods camera 306 may be capable of capturing an infrared image of a user or whatever else is in the camera's line-of-sight. Lighting of a subject during a video call may be accomplished using visible light from light 310. However, in accordance with embodiments of the present systems and methods, this light may be tunable to emit (nonvisible) infrared light and/or may include one or more infrared elements, such as infrared LEDs. Alternatively or additionally, a second light source 312 (such as illustrated around camera 306) may provide (nonvisible) infrared lighting.

As will be appreciated, IFD 103, IRD 104, or other similar devices have video conferencing capabilities, or the like, to enable a party to participate in video communication sessions with other call parties, such as non-residents of the controlled-environment facility, via video communication, secure online chat, etc.

FIG. 4 is a block diagram of an example of communication device software 300. In some embodiments, software 400 may be executed, at least in part, by communication device 103 shown in FIG. 2 and/or IRD 104 shown in FIG. 3. As illustrated, software 400 may include communication engine 401, camera/video capture interface module 402, microphone/audio capture interface module 403, handset sensor module 404, display module 405 and loudspeaker module 406. Other modules not shown in FIG. 4 for sake of brevity may include, but are not limited to, a user interface module (configured to allow a user to interact with software 400 and/or visitation system 130) and an AMS interface (configured to allow software 400 to access information stored in database 115).

In various embodiments, communication engine 401 may be configured to perform communication and/or visitation operations such as, for example, authenticate the identity of an inmate and exchange one or more messages with communication system 101, visitation system 130, and or devices 112 or 113 over network 110 to initiate an inmate communication session. During an inmate communication session, engine 401 may utilize camera/video capture interface module 402 and/or microphone/audio capture interface module 403 to provide the non-resident with video and/or audio captured from the inmate. Display module 405 and/or loudspeaker module 406 may be configured to provide an inmate with video and/or audio produced by a non-resident during the inmate communication session. Meanwhile, handset sensor 404 may include a touch sensor, a heat sensor, or a biometric sensor configured to physically detect presence of an inmate operating device 103 or 104.

Covert surveillance module 407 may be configured to perform one or more operations for covertly monitoring and/or recording of images and/or video (and in some embodiments audio) as described in detail in connection with the example implementation shown in FIGS. 5 and 6, discussed below. Covert surveillance module 407 may also monitor and/or record keystrokes or other user input received via a communication device's touch screen. In some cases, covert surveillance module 407 may be implemented, at least in part, in device 103 or 104. Additionally or alternatively, covert surveillance module 407 may be implemented, at least in part, by communications system 101.

In certain embodiments, each of the different components of communication device software 400 may be implemented in software, hardware or a suitable combination thereof, in an integrated fashion (e.g., on a single server or computer system) or in a distributed fashion (e.g., via a number of discrete systems configured to communicate with one another via a network). Additionally or alternatively, the operation of visitation software 400 may be partitioned into components in a different fashion than illustrated in FIG. 4.

Referring back to FIG. 1, IFDs 103, IRDs 104 (as well as other communication devices 102) have traditionally been used only for facilitating inmate communications, and not for covert monitoring and/or recording of images and/or video. In other words, although IFDs 103 and IRDs 104 are configured to capture images and/or video from an inmate during an inmate's communication, the inmate is aware of such capturing because, after all, the ongoing communication is enabled by that very device. Also, as noted, in some cases, IFD 103 or IRD 104 may provide an explicit indication that audio and/or video are being captured (e.g., an audio cue, a message on a display (204 or 302), a record light (209 or 310), etc.). Before an actual communication begins, and/or after the communication ends, however, IFDs 103 or IRDs 104 do not typically capture audio and/or video at other times unless invoked to do so by a user.

In contrast with the foregoing, in some embodiments described herein, communication system 101 and/or communication devices 103 or 104 may be configured to covertly monitor and/or record images and/or video using communication devices 103 or 104 in a manner that is hidden or concealed from residents of the controlled-environment facility, for example, through operation of covert surveillance module 407. In some cases, monitoring and/or recording activities may occur, at least in part, prior to a communication device being used to start an inmate communication session and/or after the communication has ended, and/or without providing an indication to the residents that audio and/or video are being captured.

Hence, in accordance with embodiments of the present systems and methods, controlled-environment facility resident communication and/or media devices, such as IFDs 103 and/or IRDs 104 may, as noted, be disposed within a controlled-environment facility, and may include at least one processor and a memory coupled to the processor(s). Program instructions associated therewith are executable by the processor(s) to enable a resident communication involving one or more residents of the controlled-environment facility, as described above. Controlled-environment facility resident communication and/or media device 103 or 104, as noted, is typically configured to provide a visual indication to the resident(s) that an image and/or video is being captured during the communication, such as via indicator 209 or 310. In accordance with embodiments of the present systems and methods, an infrared light image and/or video of one or more residents of the controlled-environment facility may be captured, while the controlled-environment facility resident communication and/or media device is not being used in any sort of resident communication and without providing the visual indication. In further embodiments, controlled-environment facility resident communication and/or media device 103 or 104 may include an infrared light source, for example as a part of aforementioned light module 206 or 310. In such embodiments, device 103 or 104 may turn on the infrared light source to capture the infrared light image and/or video of the resident(s). Such use of an infrared light source in conjunction with infrared sensitive cameras may render "night vision" type images, still and/or moving images.

Further, such infrared sensitive IFD and/or IRD cameras 205 or 306 may be used without an added infrared light source. Such use of the infrared sensitive IFD and/or IRD cameras may be of the nature of an infrared sensor. For example such use may, such as in a "bed check" scenario may be able to detect the presence of appropriately sized and shaped heat signatures in the appropriate bed(s) or the like, rather than capturing actual images or video. For example, controlled-environment facility resident communication and/or media devices 103 and/or 104 may be located in a resident sleeping area or unit of the controlled environment facility, such in a correctional environment in an inmate cell. In such embodiments, a bed check may be performed by device 103 or 104, by the device confirming the presence of a heat signature indicative of a resident in each bed expected to be occupied in the sleeping area or unit. Additionally or alternatively controlled-environment facility resident communication and/or media device 103 or 104 may present the captures infrared image and/or a video for review by an entity associated with the controlled-environment facility. Such entities may include facility personnel, facility administration system 116, or the like.

FIG. 5 is a flowchart of example implementation 500 for covert infrared monitoring and recording of images and video in controlled-environment facilities, according to some embodiments. Therein, it may be determined at 502 whether a controlled-environment facility resident communication and/or media device disposed within the controlled-environment facility is being used in any communication session. If not, at 504 any controlled-environment facility resident communication and/or media device recording indicator and/or may be disabled. At 506 if available, and necessary for capturing infrared images or video using the controlled-environment facility resident communication and/or media device, infrared light source(s) on the controlled-environment facility resident communication and/or media device may be turned on. At 508 an image and/or a video of one or more residents of the controlled-environment facility may be captured using an imaging device of the controlled-environment facility resident communication and/or media device, wherein the imaging device is capable of operation with an infrared light source. Also during the capturing at 508, the electronic display (204 or 302) of the controlled-environment facility resident communication and/or media device does not provide any visual indication that the capturing is taking place. The captured infrared light image and/or video may be stored at 510 and/or presented for review by an entity associated with the controlled-environment facility at 512. As noted such an entity associated with the controlled-environment facility, may be facility personnel, a facility administration system (116), or the like.

FIG. 6 is a flowchart of example implementation 600 for performing (covert) bed checks using infrared monitoring and/or recording of images and video in controlled-environment facilities, according to some embodiments. At 602 an image and/or a video of a bed of one or more residents of the controlled-environment facility may be captured using an imaging device of the controlled-environment facility resident communication and/or media device located in a resident sleeping area or unit of the controlled environment facility. For example, in a correction institution where the resident(s) are inmate(s), the controlled-environment facility resident communication and/or media device may be located in a pod or cell within the correctional facility. This controlled-environment facility communication and/or media device imaging device is, in accordance with embodiments of the present systems and methods, capable of operation with an infrared light source.

At 604 a bed check may be performed by the controlled-environment facility resident communication and/or media device, such as by determining whether a heat signature indicative of a person is present in the bed. Step 604 may encompass more than one bed and one heat signature in the sleeping unit and/or may be repeated for each bed in the sleeping area or unit. Regardless, at 606 an entity associated with the controlled-environment facility may be alerted if less than an expected number of residents are in the beds of the sleeping area or unit. Hence, embodiments of the present systems and methods may "look" for bodies using heat signatures. For example, at say 9:00 pm, a resident is not in a monitored bed, an alert will sound; and/or embodiments of the present systems and methods may "know" how many people are supposed to be in each correctional facility cell, or the like, and if there were less than the right amount, the system would send an alert.

Additionally or alternatively, at 608 the infrared image or video may be presented for review by an entity associated with the controlled-environment facility, such as to facility personnel, a facility administration system (116), or the like, and at 610 the entity associated with the controlled-environment facility may perform the bed check using the presented image, such as by determining whether a heat signature indicative of a person is present in the bed.

Embodiments of systems and methods for covertly monitoring and/or recording of images and/or video in controlled-environment facilities using infrared imaging, as described herein, may be implemented or executed by one or more computer systems. One such computer system is illustrated in FIG. 7. In various embodiments, computer system 700 may be a server, a mainframe computer system, a workstation, a network computer, a desktop computer, a laptop, or the like. For example, in some cases, blocks 101, 116, or 130, shown in FIG. 1 may include computer system 300. Moreover, communication devices 103-105, 112, and 113 may be implemented as computer system 300. As explained above, in different embodiments these various computer systems may be configured to communicate with each other in any suitable way, such as, for example, via network 110.

As illustrated, computer system 700 includes one or more processors 710A-N coupled to a system memory 720 via bus 730. Computer system 700 further includes a network interface 740 coupled to bus 730, and one or more I/O controllers 750, which in turn are coupled to peripheral devices such as cursor control device 760, keyboard 770, display(s) 780, etc. Each of I/O devices 760-780 may be capable of communicating with I/O controllers 750, for example, via a wired connection (e.g., serial port, Universal Serial Bus port) or wireless connection (e.g., Wi-Fi, Bluetooth, Near Field Communications Link, etc.) Other devices may include, for example, surveillance cameras, microphones, antennas/wireless transducers, phone detection modules, etc.

In various embodiments, computer system 700 may be a single-processor system including one processor 710A, or a multi-processor system including two or more processors 710A-N (e.g., two, four, eight, or another suitable number). Processors 710 may be any processor capable of executing program instructions. For example, in various embodiments, processors 710 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 710 may commonly, but not necessarily, implement the same ISA. Also, in some embodiments, at least one processor 710 may be a graphics processing unit (GPU) or other dedicated graphics-rendering device.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as those described herein may be stored within system memory 720 as program instructions 725 and data storage 735, respectively. In other embodiments, program instructions and/or data may be received, sent or stored upon different types of computer-accessible media or on similar media separate from system memory 720 or computer system 700.

Generally speaking, a computer-accessible medium may include any tangible or non-transitory storage media or memory media such as electronic, magnetic, or optical media—e.g., disk or CD/DVD-ROM coupled to computer system 700 via bus 730. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 730 may be configured to coordinate I/O traffic between processor 710, system memory 720, and any peripheral devices in the device, including network interface 740 or other peripheral interfaces, such as input/output devices 750. In some embodiments, bus 730 may perform any necessary protocol, timing or other data transformations to convert data signals from one component (e.g., system memory 720) into a format suitable for use by another component (e.g., processor 710). In some embodiments, bus 730 may include support for devices attached through various types of peripheral buses, such as a variant of the Peripheral Component Interconnect (PCI) bus standard or the Universal Serial Bus (USB) standard, for example. In some embodiments, the function of bus 730 may be split into two or more separate components, such as a northbridge chipset and a southbridge chipset, for example. In addition, in some embodiments some or all of the functionality of bus 730, such as an interface to system memory 720, may be incorporated directly into processor(s) 710A-N.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 750 may, in some embodiments, enable communications with one or more display terminals, keyboards, keypads, touchpads, scanning devices, voice or optical recognition devices, mobile devices, or any other devices suitable for entering or retrieving data by one or more computer system 700. Multiple I/O controllers 750 may be present in computer system 700 or may be distributed on various nodes of computer system 700. In some embodiments, I/O devices may be separate from computer system 700 and may interact with one or more nodes of computer system 700 through a wired or wireless connection, such as over network interface 740.

As shown in FIG. 7, memory 720 may include program instructions 725, configured to implement certain embodiments described herein, and data storage 735, comprising various data may be accessible by program instructions 725. In an embodiment, program instructions 725 may include software elements shown in FIG. 3, which may be configured to effect the operations shown in FIG. 5. Program instructions 725 may be implemented in various embodiments using any desired programming language, scripting language, or combination of programming languages and/or scripting languages (e.g., C, C++, C#, Java™, JavaScript™, Perl, etc.). Data storage 735 may include data that may be used in these embodiments (e.g., recorded communications, profiles for different modes of operations, etc.). In other embodiments, other or different software elements and data may be included.

A person of ordinary skill in the art will appreciate that computer system 700 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various systems and methods illustrated in the figures and described herein represent example embodiments of systems and methods for covert monitoring and recording of audio and video in controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility resident communication and/or media device disposed within a controlled-environment facility, the controlled-environment facility resident communication and/or media device comprising:
   at least one processor; and
   a memory coupled to the at least one processor, the memory configured to store program instructions executable by the at least one processor to cause the controlled-environment facility resident communication and/or media device to:
   capture an infrared light image and/or infrared light video of one or more residents of the controlled-environment facility
   perform a bed check by confirming the presence of a heat signature indicative of a resident in a bed in the sleeping area or unit; and
   alert an entity associated with the controlled-environment facility if there are fewer than an expected number of residents in the beds.

2. The controlled-environment facility resident communication and/or media device of claim 1, further comprising at least one infrared light source, and wherein the program instructions are further executable by the at least one processor to cause the controlled-environment facility resident communication and/or media device to turn on the infrared light source to capture an infrared light image and/or infrared light video of one or more residents.

3. The controlled-environment facility resident communication and/or media device of claim 1, wherein the program instructions are further executable by the at least one processor to cause the controlled-environment facility resident communication and/or media device to:
   present the infrared light image and/or infrared light video for review by an entity associated with the controlled-environment facility.

4. The controlled-environment facility resident communication and/or media device of claim 1, wherein the controlled-environment facility resident communication and/or media device is a video visitation device.

5. The controlled-environment facility resident communication and/or media device of claim 1, wherein the controlled-environment facility resident communication and/or media device is a personal resident communication and/or media device.

6. A method for covertly monitoring residents of a controlled-environment facility, the method comprising:
   capturing an infrared image and/or infrared light video of one or more residents of a controlled-environment facility using an imaging device of a controlled-environment facility resident communication and/or media device disposed within a resident sleeping area or unit of the controlled-environment facility;
   performing a bed check by the controlled-environment facility resident communication and/or media device, using the infrared image and/or infrared light video, confirming a presence or absence of residents in the sleeping area or unit; and
   alerting an entity associated with the controlled-environment facility if there are fewer than an expected number of residents in the resident sleeping area or unit.

7. The method of claim 6, wherein the one or more residents are inmates, and wherein the controlled-environment facility is a correctional facility, and the controlled-environment facility resident communication and/or media device is located in a pod or cell within the correctional facility.

8. The method of claim 6, wherein performing the bed check further comprises confirming a presence or absence of a heat signature indicative of a resident in the sleeping area or unit.

9. The method of claim 6, further comprising turning on at least one infrared light source on the controlled-environment facility resident communication and/or media device for capturing the infrared image and/or infrared light video using the imaging device.

10. The method of claim 6, wherein the controlled-environment facility resident communication and/or media device is a video visitation device.

11. The method of claim 6, wherein the controlled-environment facility resident communication and/or media device is a personal resident communications and/or media device.

12. The method of claim 6, wherein the entity associated with the controlled-environment facility is one or more personnel of the facility or a facility administration system.

13. The method of claim 6, wherein the controlled-environment facility resident communication and/or media device includes a recording indicator, and during the capturing the recording indicator does not provide an indication that the capturing is taking place.

14. A non-transitory computer-readable storage medium having program instructions stored thereon that, upon execution by a controlled-environment facility resident communication and/or media device disposed within a resident sleeping area or unit of a controlled-environment facility, cause the controlled-environment facility resident communication and/or media device to:

capture an image and/or video of one or more residents of the controlled-environment facility using infrared imaging of the controlled-environment facility resident communication and/or media device;

perform a bed check by confirming presence of a number of expected number of residents in the sleeping area or unit; and alert an entity associated with the controlled-environment facility if the expected number of residents are not present.

15. The non-transitory computer-readable storage medium of claim 14, wherein the program instructions stored thereon are further executable to cause the controlled-environment facility resident communication and/or media device to store the image and/or video and/or present the image and/or video for review by an entity associated with the controlled-environment facility.

16. The non-transitory computer-readable storage medium of claim 14, wherein the program instructions stored thereon are further executable to cause the controlled-environment facility resident communication and/or media device to perform the bed check by confirming presence of a number of expected heat signatures indicative of the expected number of residents in the sleeping area or unit.

17. The non-transitory computer-readable storage medium of claim 14, wherein the program instructions stored thereon are further executable to cause the controlled-environment facility resident communication and/or media device to turn on at least one infrared light source on the controlled-environment facility resident communication and/or media device for capturing the image and/or video using an imaging device of the controlled-environment facility resident communication and/or media device.

18. The controlled-environment facility resident communication and/or media device of claim 1, wherein the program instructions are further executable by the at least one processor to cause the controlled-environment facility resident communication and/or media device to capture the infrared light image and/or infrared light video while the controlled-environment facility resident communication and/or media device is not being used in a resident communication.

19. The controlled-environment facility resident communication and/or media device of claim 1, wherein the program instructions are further executable by the at least one processor to cause the controlled-environment facility resident communication and/or media device to capture the infrared light image and/or infrared light video without providing a visual indication.

20. The method of claim 6, further comprising storing the infrared image and/or infrared light video and/or presenting the infrared image and/or infrared light video for review by an entity associated with the controlled-environment facility.

21. The non-transitory computer-readable storage medium of claim 14, wherein the program instructions stored thereon are further executable to cause the controlled-environment facility resident communication and/or media device to capture the image and/or video while the controlled-environment facility resident communication and/or media device is not being used in a resident communication.

22. The method of claim 6 wherein capturing of the infrared image and/or infrared light video is carried out when the controlled-environment facility resident communication and/or media device is not being used in a resident communication.

\* \* \* \* \*